July 23, 1935.     E. V. TAYLOR     2,009,100
BRAKE
Filed Jan. 8, 1931

INVENTOR.
EUGENE V. TAYLOR
BY O. H. Fowler
ATTORNEY

Patented July 23, 1935

2,009,100

UNITED STATES PATENT OFFICE 2,009,100

BRAKE

Eugene V. Taylor, Chicago, Ill., assignor to Bendix Brake Company, South Bend, Ind., a corporation of Illinois Application January 8, 1931, Serial No. 507,330

11 Claims. (Cl. 188—78)

This invention relates to brakes and more particularly to internal expanding brakes.

Broadly, the invention comprehends a brake for motor vehicles, preferably a brake of the duo servo type having means for applying friction elements, so that the applied pressure will be transmitted from one friction element through a suitable connection to another friction element with substantial increase in the applied pressure.

An important object of the invention is to provide a brake operating means and means associated therewith for applying friction elements to the braking surface of a drum with smooth action devoid of grabbing and clicking and to so arrange these parts that the friction elements may be supported thereby in proper spaced relation to the braking surface of the drum when in released position.

Another important object of the invention is to provide a connection between the articulated ends of friction elements arranged to transmit applied pressure from one friction element to the other friction element through suitable linkage with a substantial increase in the applied pressure.

The above and other objects of the invention including various desirable details of structure will be apparent from the following description taken in connection with the drawing, forming a part of this specification, and in which.

Figure 1:
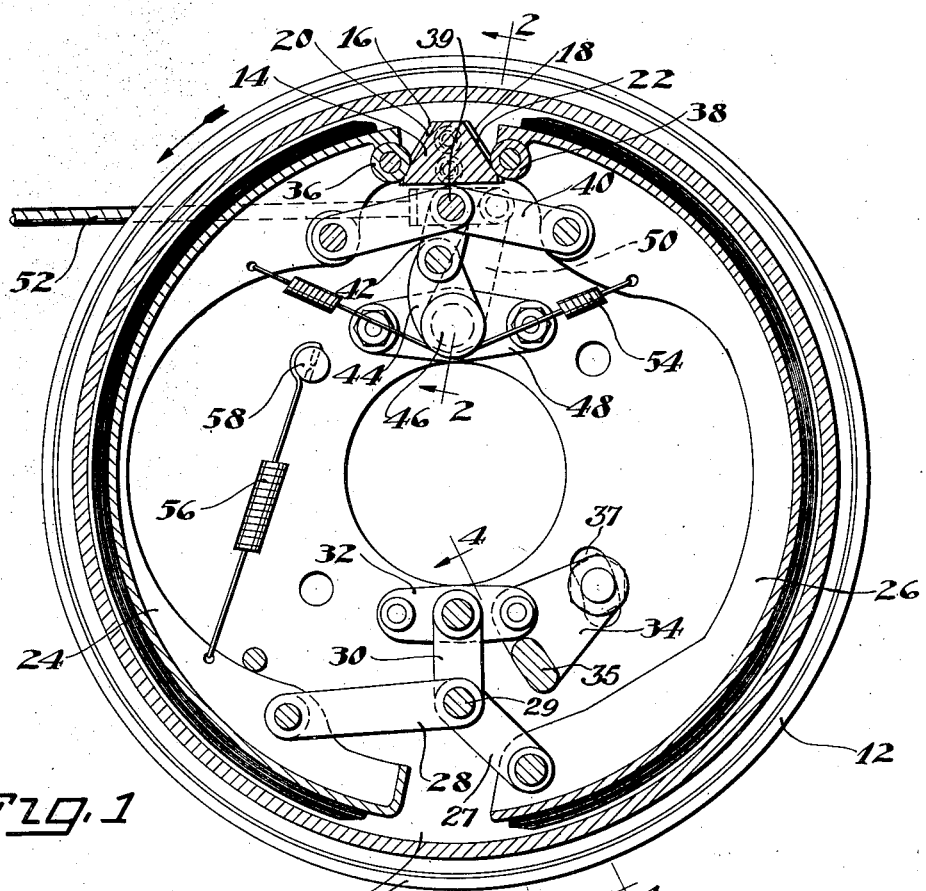
Figure 1 is a vertical section of a brake taken just back of the head of the drum illustrating in elevation the friction elements, the operating means and the connection between the articulated ends of the friction elements.
Figures 2, 3, 4:
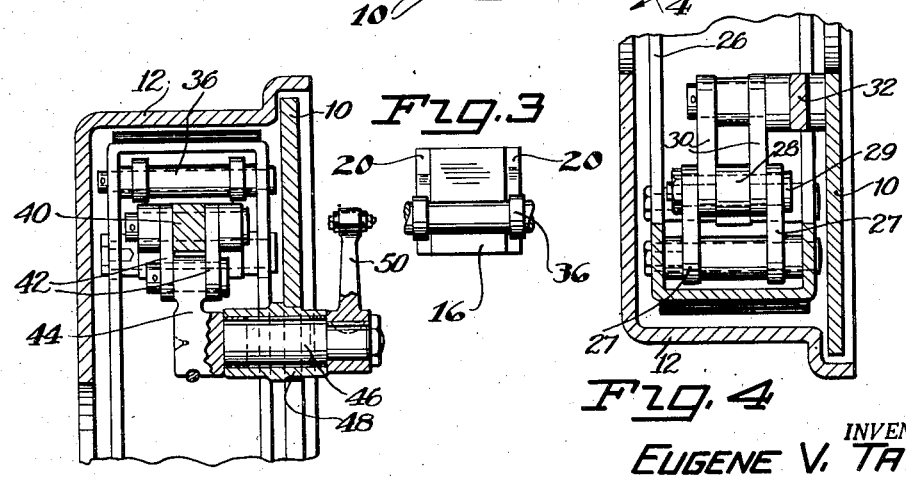
Figure 2 is a section substantially on line 2—2, Figure 1.
Figure 3 is a detail view of the anchor.
Figure 4 is a section substantially on line 4—4, Figure 1.

Referring to the drawing for more specific details of the invention, 10 represents a fixed support such as a backing plate. The backing plate has associated therewith a rotatable drum 12 which may be secured to a wheel, not shown. Positioned on the backing plate is a fixed anchor 14 provided with inclined faces 16 and 18 arranged in oppositely disposed relation in planes intersecting each other substantially at the inner periphery of the drum, and paralleling these faces are spaced runways 20 and 22.

Arranged for movement on the backing plate is a primary friction element 24 and a secondary friction element 26. The primary and secondary friction elements are connected at their articulated ends by a toggle comprising a longer link 28 and a pair of shorter links 27 the knee 29 of the toggle being connected by links 30 to a suitable bracket 32 fixed to the backing plate. A plate 34 positioned on the backing plate has a transverse stop 35 arranged in the path of the knee 29 and made adjustable in a slot 37 so that the limit of the applied force to the secondary friction element will be reached when the knee 29 of the toggle engages the stop. The links 27, 28, and 30 are disposed at such an angle relative to each other that the resultant force exerted through link 27 is greater than the applied force exerted through link 28. In other words, the force exerted by shoe 24 on shoe 26 is multiplied by the toggle.

The separable ends of the friction element are provided with rollers 36 and 38 adapted to travel on the runways 20 and 22 on the anchor 14 with the inclined faces 16 and 18 between the respective rollers. The relative position of these runways to the braking surface of the drum is such that the anchoring end of the friction element depending upon direction of drum rotation will be wedged against the braking surface of the drum.

The separable ends of the friction elements are connected by a toggle 40, the knee of which engages the base of the anchor when the brake is in released position, and when in this position, the friction elements are supported on the anchor by the rollers 36 and 38 held in engagement by the toggle 40 under the tension of a suitable spring, to be hereinafter described, connected between the friction elements.

The knee 39 of the toggle 40 is connected by suitable links 42 to a lever 44 positioned on a shaft 46 mounted in a bracket 48 on the backing plate and secured to the shaft is a lever 50 connected by a clevis to a suitable tension member 52. The friction elements are connected by a return spring 54. This spring urges the knee of the toggle 40 against the base of the anchor and retains the separable ends of the friction elements against the anchor. There is also provided a return spring 56 connected between the primary friction element and a fixed support 58 on the backing plate. These springs serve to return and retain the friction elements in the off position in proper spaced relation to the braking surface of the drum.

In operation, force is applied through tension member 52 to the lever 50. This actuates the lever 44 connected by a link to the knee of the toggle 40 to straighten the toggle and spread the separable ends of the friction elements into engagement with the braking surface of the drum.

Assuming that the drum is rotating counter-clockwise as indicated by the arrow in Figure 1, the movement of the primary friction element upon engaging the drum is augmented by the wiping action of the drum, and the movement of this element transmits the applied force with substantial increase to the secondary friction element through the action of links 26 and 27 to apply the secondary element. The secondary element anchors on the fixed anchor 14. Since the anchor 14 is provided with inclined runways, there is produced a wedging action of the anchored end of the friction element against the braking surface of the drum.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a fixed support, an anchor on the support having oppositely arranged inclined faces, runways on the faces, a friction element on the support having separable ends and rollers on the separable ends adapted to engage the runways.

2. A brake comprising a fixed support, an anchor thereon, inclined surfaces on the anchor, guideways arranged in parallel relation to the inclined surfaces, a friction element having separable ends and rollers on the separable ends having spaced flanges adapted to engage the runways and to be retained thereon by the inclined surfaces.

3. A brake comprising a fixed support, a drum associated therewith, an anchor on the support, inclined runways on the anchor arranged in spaced relation, raised surfaces between the runways, a friction element on the support adapted to engage the drum and rollers on the friction element adapted to engage the inclined runways and to be retained thereon by the raised surfaces.

4. A brake comprising a fixed support, an anchor thereon having oppositely arranged inclined surfaces, a friction element having separable ends adaptable for engagement with the inclined anchoring surfaces, a toggle connecting the separable ends and means associated therewith for urging the knee of the toggle against the anchor.

5. A brake comprising a fixed support, an anchor thereon, oppositely arranged inclined surfaces on the anchor, friction elements having separable ends adaptable for engagement with the inclined surfaces, a toggle connecting the separable ends of the friction elements and a tension member connected between the friction elements urging the knee of the toggle against the anchor to retain the separable ends of the friction elements in engagement therewith.

6. A brake comprising a fixed support, an anchor thereon, oppositely arranged inclined surfaces on the support, guideways paralleling the inclined surfaces, a friction element having separable ends, rollers on the separable ends adapted to engage the inclined guideways and to be retained thereon by the inclined surfaces, a toggle connected between the separable ends and a tension member urging the knee of the toggle against the anchor.

7. A connection for the shoes of a brake comprising pivotally connected links adapted to be connected to the shoes, a pivotally-mounted member supportingly engaging said links, and a pivotally-mounted adjustable stop limiting the movement of said links.

8. A brake comprising shoes having their ends connected by a pivotally-mounted linkage, and a pivotally-mounted adjustable stop limiting the movement of said linkage.

9. A brake shoe connection having associated therewith a pivotally-mounted plate carrying a stop for said connection, in combination with a slotted means for holding the plate in adjusted position.

10. An adjustably supported stop for a brake shoe connection having a pivot mounting and a slotted means spaced from said mounting for holding it in adjusted position.

11. An adjustably supported pivoted stop for a brake having a slotted means spaced from its pivot for holding it in adjusted position.

EUGENE V. TAYLOR.